(12) United States Patent
Riley

(10) Patent No.: US 6,199,930 B1
(45) Date of Patent: Mar. 13, 2001

(54) LOW PROFILE COMPARTMENT FOR VEHICLE DOOR

(76) Inventor: Ronald E. Riley, 900 Silver Streak, Fort Worth, TX (US) 76131

( * ) Notice: Subject to any disclaimer, the term of this patent is extended or adjusted under 35 U.S.C. 154(b) by 0 days.

(21) Appl. No.: 09/292,780

(22) Filed: Apr. 13, 1999

(51) Int. Cl.⁷ .................................................. B60R 9/06
(52) U.S. Cl. ......................................... 296/37.6; 224/404
(58) Field of Search ................................ 296/37.1, 37.6, 296/37.13; 224/404

(56) References Cited

U.S. PATENT DOCUMENTS

| | | | |
|---|---|---|---|
| 1,694,855 | * 12/1928 | Irons | 296/37.13 |
| 2,019,674 | * 11/1935 | Graebner | 296/37.13 |
| 4,135,761 | 1/1979 | Ward . | |
| 4,266,821 | 5/1981 | Gillet . | |
| 4,283,083 | 8/1981 | Johnson . | |
| 4,749,226 | 6/1988 | Heft . | |
| 4,938,398 | 7/1990 | Hallsen . | |
| 5,207,469 | 5/1993 | Rossi . | |
| 5,215,346 | 6/1993 | Reitzloff et al. . | |
| 5,232,259 | 8/1993 | Booker . | |
| 5,372,289 | * 12/1994 | Dachicourt | 296/37.1 |
| 5,484,092 | * 1/1996 | Cheney | 224/404 |
| 5,498,049 | 3/1996 | Schlachter . | |
| 5,518,158 | 5/1996 | Matlack . | |
| 5,575,521 | 11/1996 | Speis . | |
| 5,702,144 | * 12/1997 | Matsuura et al. | 296/37.13 |
| 5,730,344 | 3/1998 | Mauch . | |
| 5,795,005 | * 8/1998 | Garfias et al. | 296/37.13 |
| 5,800,004 | * 9/1998 | Ackeret | 296/37.13 |

* cited by examiner

Primary Examiner—Gary C. Hoge
(74) Attorney, Agent, or Firm—Mary M. Lee

(57) ABSTRACT

A low profile toolbox or other compartment for installation in the tailgate of a pickup truck or in any other vehicle door. The toolbox has a body portion that is installed inside the tailgate through an opening in the inner or outer panel. A flat lid is pivotally attached by means of a frame over the opening. Because the lid is flat and the body is inside the cavity, the top surface of the toolbox is substantially flush with the inner panel of the tailgate. In this way, when the tailgate is open, the toolbox creates no obstacle to use of the tailgate to slide objects in and out of the truck bed. Yet, the toolbox is more easily accessible than if it were attached to one of the sidewalls of the truck, at the front of the bed, or even inside the truck.

36 Claims, 3 Drawing Sheets

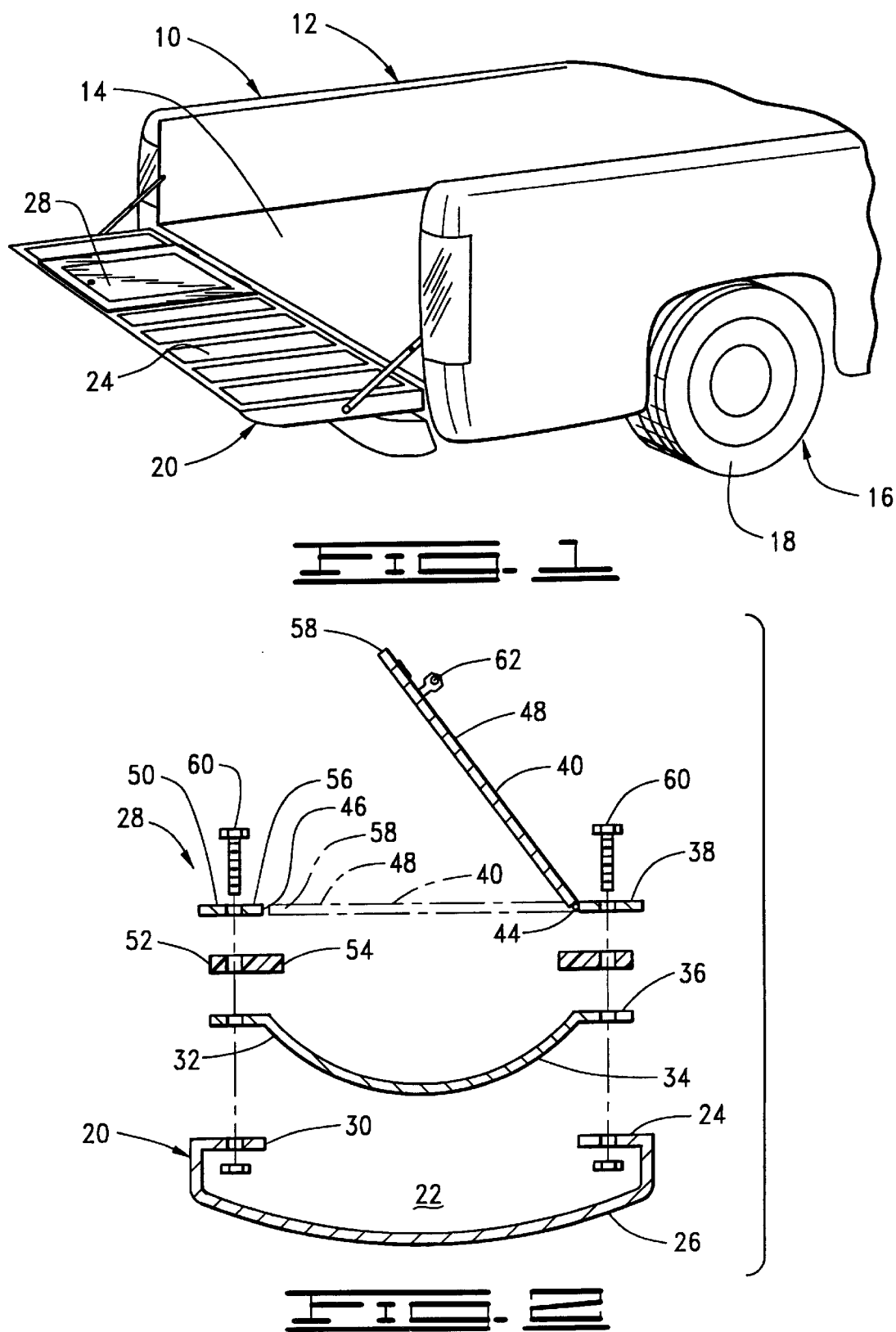

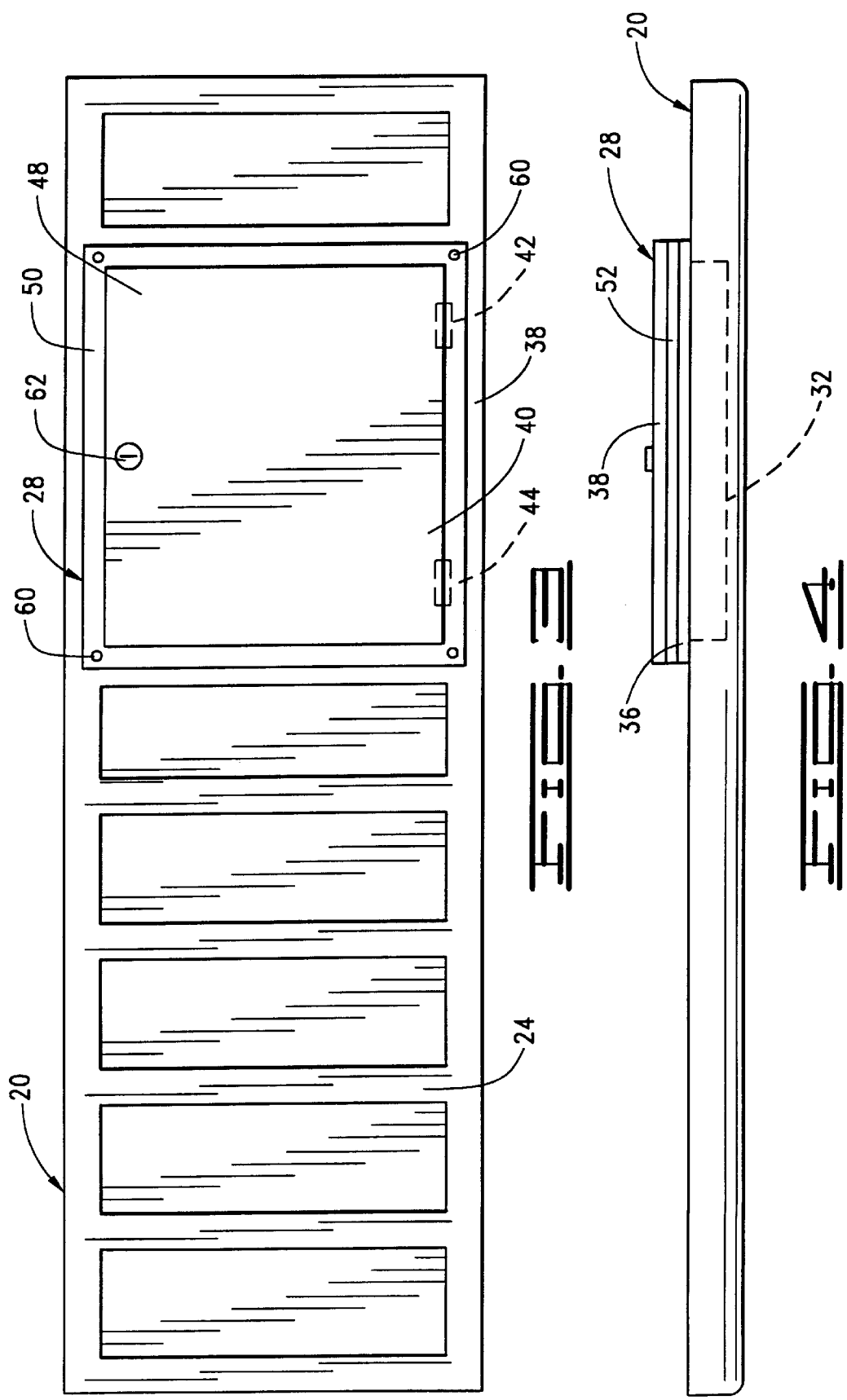

LOW PROFILE COMPARTMENT FOR VEHICLE DOOR

FIELD OF THE INVENTION

The present invention relates generally to storage compartments for vehicles and more particularly to toolboxes mountable inside the tailgates of pickup trucks.

BACKGROUND OF THE INVENTION

Modern pickups and other vehicles are provided with several storage compartments including glove boxes, map pockets and the like. For larger equipment, metal boxes are commercially available for mounting in the bed of the pickup behind the cab. A variety of toolboxes and compartments are available for mounting in the beds of pickups. However, there remains a need for secure storage space for pickups which is easily accessible but does not take up valuable bed space or obstruct access to the bed over the tailgate.

SUMMARY OF THE INVENTION

The present invention is directed to a compartment assembly for installation in the door of a vehicle, wherein the door has a cavity defined by an inner panel and an outer panel. The compartment assembly is installed in an opening in a selected one of the inner or outer panels that form the cavity. The assembly includes a body sized to be received in the cavity of the vehicle door through the opening, and a lid mountable over the opening. The lid is movable between an open position and a closed position, and in the closed position the lid is substantially flush with the selected one of the inner and outer panels.

Still further, the present invention is directed to a vehicle comprising a carriage, a drive system, and a door. The door has a cavity defined by an inner panel and an outer panel, and a selected one of the inner and outer panels has an opening therein into the cavity. A compartment assembly, as described above, is installed in the door through the opening, so that the lid of the compartment is substantially flush with the surface of the door.

BRIEF DESCRIPTION OF THE DRAWINGS

FIG. 1 shows a perspective view of the rear of a pickup truck illustrating the low profile compartment of the present invention installed in the tailgate.

FIG. 2 shows an exploded, sectional view of a first embodiment of the compartment assembly of the present invention.

FIG. 3 shows a plan view of a tailgate with the low profile compartment assembly installed therein.

FIG. 4 shows an end view of the tailgate of FIG. 3.

DETAILED DESCRIPTION OF THE PREFERRED EMBODIMENT

Figure 5:
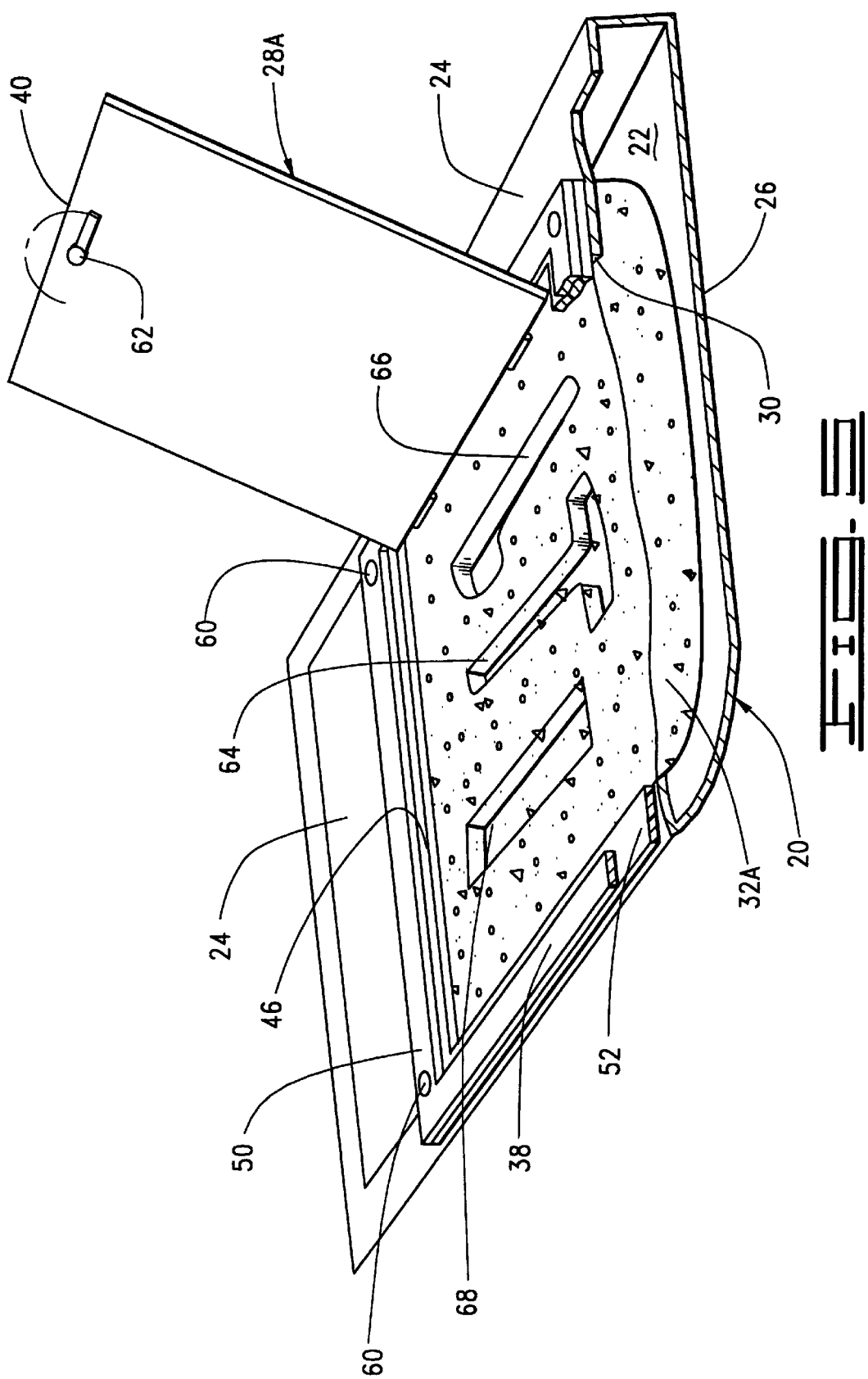
FIG. 5 shows a second embodiment of the invention wherein the body of the compartment assembly is formed of foam and has recesses to receive tools.

The present invention is directed to a toolbox or other compartment mountable inside the tailgate of a pickup truck or other vehicle door. The compartment, while it may vary widely in its dimensions, is sized fit inside the cavity in the tailgate and the lid is flat so that when the compartment is closed the lid is substantially flush with the tailgate. In this way, when the tailgate is open the closed compartment presents no significant obstruction to the movement of objects in and out of the truck bed across the tailgate. Moreover, the compartment does not occupy any of the space in the truck bed. Yet, the compartment is easily accessible when the tailgate is open or closed. These and other advantages will be apparent from the following description.

With reference now to the drawings in general and to FIG. 1 in particular, there is shown therein a vehicle and more specifically a pickup truck constructed in accordance with the present invention and designated by the reference numeral 10. As illustrated in FIG. 1, the truck 10 has a carriage 12 comprising an open bed 14 in the rear. The carriage 12 is supported on and steered by a drive system 16 of some sort comprising a plurality of wheels 18, a drive train (not shown), a steering mechanism (not shown) and an engine (not shown).

The truck 10 or other vehicle is characterized by at least one door, such as the tailgate 20, which has a cavity 22 defined by an inner panel 24 and an outer panel 26, as illustrated in FIG. 2. The compartment assembly 28 of this invention is specially designed to be installed in such a door, and preferably in the tailgate 20 of the truck 10. As shown, the compartment assembly 28 is contained within the tailgate 20 so that when the compartment is closed there is no significant obstruction to use of the tailgate or to access to the bed 14. The tailgate 20 or other door comprises an opening 30 in either the inner panel 24 or the outer panel 26 through which the assembly 28 is installed.

A preferred construction of the compartment assembly 28 is shown in FIG. 2. The assembly 28 comprises a body 32. In this embodiment, the body 32 comprises an integrally formed, relatively rigid member, which can be formed of plastic or metal or any other suitable material.

The assembly 28 is installed through the opening 30 While the opening 30 may be formed in either the inner panel 24 or the outer panel 26, the inner panel is preferred as this renders the assembly 28 accessible when the tailgate 20 is open or closed.

Now it will be appreciated that the body 32 is sized to be received in the cavity 22 through the opening 30 in the inner panel 24. The shape of the body 32 may vary depending on the size and type of objects which are to be stored in it. Preferably, the body 32 comprises a recessed center portion 34 with a peripheral flange 36. As shown in FIG. 2, the flange 36 may be sized to overlay the edge of the opening 28.

Referring now also to FIG. 3, the assembly 28 preferably comprises a frame 38 sized to surround the opening 30 and to overlay the flange 36 of the body 32. The assembly 28 includes a lid 40, which is movably mountable over the opening 30. The lid 40 is movable between an open position (shown in solid lines) and a closed position (shown in broken lines) illustrated in FIG. 2. In this embodiment, the lid 40 is pivotally connected to the frame 38 by hinges 42 and 44. However, it will be apparent that the lid can be mounted for movement in a variety of other ways. For example, the lid could be mounted in slideways for a sliding movement.

As seen in FIGS. 2 and 3, the frame 38 and the lid 40 may be cut out of a single flat piece of material so that the lid 40 fits inside the opening 46 of the frame 38. In this way, the top surface 48 of the lid 40 and the top surface 50 of the frame 38 are flush or parallel when the lid is closed. This also provides the lowest possible profile for the compartment so that when the lid 40 is in the closed position it is substantially flush with the panel through which it is mounted, as shown best in FIGS. 3 and 4.

With continued reference to FIG. 2, a seal 52 preferably is provided to render the compartment water-resistant. The seal 52 may be sized to be positioned between the flange 36 of the body 32 and the frame 38. More preferably, the inner edge 54 of the seal 52 extends inwardly slightly further than the inner edge 56 of the frame 38 so that the outer edge 58 of the lid 40 will overlap the inner edge of the seal.

Now it will be appreciated that in the embodiment shown in FIG. 2, the entire assembly 28 may be mounted to the inner panel 24 by a plurality of connectors 60 which extend through the frame 38, the seal 52, the flange 36 of the body 32, and the edge of the opening 30 in the inner panel 24. A nut and bolt type connector is suitable, as are many other kinds of connectors, such as screws, brads, clamps and rivets, as well as glues, welding and crimping.

As shown in FIGS. 2 and 3, the lid 40 may be provided with a latch 62 for securing the lid in the closed position. While a keyed lock is shown, any type of lockable or unlockable latch may be used.

Now the low profile feature of the assembly 28 will be apparent and is illustrated best in FIG. 4 to which attention now is directed. In this FIG., the thicknesses of the frame 38, the seal 52 and the flange 36 are exaggerated for purposes of illustration. As illustrated, the overall thickness of the assembly 28 extends only slightly above the surface of the inner panel 24 making the assembly substantially flush with the inner panel presenting no significant obstruction to use of the tailgate 20.

Turning now to FIG. 5 another embodiment of the compartment assembly of the present invention will be described. In this embodiment, designated by the reference numeral 28A, the frame 38, the lid 40 and the seal 52 are constructed as in the embodiment of FIGS. 1–4. The body 32A is formed of a foam material. This foam body 32A may be formed by various known methods. For example, the foam body 32A may be cut from a sheet of flexible foam material, which is commercially availability in different thicknesses and in a range of rigidities.

The foam body 32A may be formed with at least one recess. More preferably, the foam body 32A is formed with a plurality of recesses, such as the recesses 64, 66 and 68, having shapes selected to correspond to the shape of the tools to be stored in the compartment. The assembly 28A preferably also comprises connectors 60, such as nuts and bolts, to attach the frame 38 and seal 52 to the inner panel 24 of the tailgate 20. However, some form of adhesive is preferred for anchoring the foam body 32A in its position. For example, commercially available spray adhesives may be used according to the manufacturer's instructions to secure the foam body 32A in place.

Now it will be appreciated that the present invention provides important improvements in storage compartments for pickup trucks and other vehicles. The size and shape of the compartment may vary widely depending on its purpose and the size, the depth and the shape of the door. For example, in one embodiment not illustrated herein, the lid of the assembly is almost coextensive with the inner panel of the tailgate, so that the entire cavity inside the tailgate is converted in accordance with this invention into usable storage space.

The compartment assembly of this invention is rendered accessible from outside the vehicle by simply opening the door into which it is installed. Of course, in the case of the tailgate in a pickup with an open bed, the compartment is also accessible when the tailgate is closed.

The lid of the compartment can be transparent so that the contents of the compartment are visible. Alternately, where security is a desired feature, the lid can be solid or opaque to conceal the contents.

The compartment can be formed in the tailgate when the vehicle is manufactured. However, the compartment assembly of this invention can be installed in the door of an existing vehicle by simply cutting an opening in the door. Thus, installation of compartment in an existing vehicle is also simple and inexpensive.

Changes can be made in the combination and arrangement of the various parts and elements described herein without departing from the spirit and scope of the invention, as defined in the following claims.

What is claimed is:

1. A compartment assembly for installation in a door in a vehicle, wherein the door has a cavity defined by an inner panel and an outer panel, wherein a selected one of the inner or outer panel has an opening therein to receive the compartment assembly, the assembly comprising:
    a body forming a compartment sized to be received in the cavity of the vehicle door through the opening and supportable inside the cavity; and
    a lid mountable over the opening, the lid being movable between an open position and a closed position, wherein in the closed position the lid is substantially flush with the selected one of the inner and outer panels.

2. The assembly of claim 1 wherein the body comprises a rigid, integrally formed member having a peripheral flange sized to overlay the edge of the door opening and a recessed center portion receivable in the cavity of the door.

3. The assembly of claim 2 wherein the assembly further comprises a frame sized to surround the opening and to overlay the flange of the body and wherein the lid is movably mounted to the frame.

4. The assembly of claim 3 further comprising a seal sized to be positioned between the flange of the body and the frame.

5. The assembly of claim 4 wherein the lid is pivotally connected to the frame.

6. The assembly of claim 5 wherein the assembly further comprises a lock in the lid.

7. The assembly of claim 6 wherein the lid is rendered mountable over the opening by means of a plurality of connectors which extend through the frame, the seal, the flange of the body and the edge of the opening.

8. The assembly of claim 7 where in the connectors each comprises a nut and bolt.

9. The assembly of claim 8 wherein the lid and the frame each have a top surface, wherein the lid is received inside the frame so that the top surface of the frame and the top surface of the lid are parallel.

10. The assembly of claim 1 wherein the body is formed of foam.

11. The assembly of claim 10 wherein the foam body is provided with recesses of selected shapes.

12. The assembly of claim 11 wherein the lid is pivotally mounted.

13. The assembly of claim 1 further comprising a seal disposable between the lid and the body.

14. The assembly of claim 1 wherein the lid is pivotally mounted.

15. A vehicle comprising:
    a carriage;
    a drive system;
    a door having a cavity defined by an inner panel and an outer panel and wherein a selected one of the inner and outer panels has an opening therein into the cavity; and a compartment comprising:
- a body forming a compartment sized to be received in the cavity of the door through the opening and supported inside the cavity; and
- a lid movable between an open position and a closed position, the lid being substantially flush with the selected one of the inner and outer panels when in the closed position.

16. The vehicle of claim 15 wherein the vehicle is a pickup truck and the door is the tailgate of the bed of the pickup.

17. The vehicle of claim 16 wherein the opening is in the inner panel of the tailgate.

18. The vehicle of claim 17 wherein the body comprises a rigid, integrally formed member having a peripheral flange sized to overlay the edge of the door opening and a recessed center portion receivable in the cavity of the door.

19. The vehicle of claim 18 wherein the assembly further comprises a frame sized to surround the opening and to overlay the flange of the body and wherein the lid is movably mounted to the frame.

20. The vehicle of claim 19 further comprising a seal sized to be positioned between the flange of the body and the frame.

21. The vehicle of claim 20 wherein the lid is pivotally connected to the frame.

22. The vehicle of claim 21 wherein the assembly further comprises a lock in the lid.

23. The vehicle of claim 22 wherein the lid is rendered mountable over the opening by means of a plurality of connectors which extend through the frame, the seal, the flange of the body and the edge of the opening.

24. The vehicle of claim 23 where in the connectors each comprises a nut and bolt.

25. The vehicle of claim 24 wherein the lid and the frame each have a top surface, wherein the lid is received inside the frame so that the top surface of the frame and the top surface of the lid are parallel.

26. The vehicle of claim 16 wherein the body is formed of foam.

27. The vehicle of claim 26 wherein the foam body is provided with recesses of selected shapes.

28. The vehicle of claim 15 wherein the body is formed of foam.

29. The vehicle of claim 28 wherein the foam body is provided with recesses of selected shapes.

30. The vehicle of claim 29 wherein the assembly further comprises a frame sized to surround the opening and wherein the lid is movably mounted to the frame.

31. The vehicle of claim 30 further comprising a seal sized to be positioned between the edge of the opening in the door panel and the frame.

32. The vehicle of claim 31 wherein the lid is pivotally connected to the frame.

33. The vehicle of claim 15 wherein the body comprises a rigid, integrally formed member having a peripheral flange sized to overlay the edge of the door opening and a recessed center portion receivable in the cavity of the door.

34. The vehicle of claim 33 wherein the assembly further comprises a frame sized to surround the opening and to overlay the flange of the body and wherein the lid is movably mounted to the frame.

35. The vehicle of claim 34 further comprising a seal sized to be positioned between the flange of the body and the frame.

36. The vehicle of claim 35 wherein the lid is pivotally connected to the frame.

* * * * *